US008681714B2

(12) United States Patent
Eun et al.

(10) Patent No.: US 8,681,714 B2
(45) Date of Patent: Mar. 25, 2014

(54) APPARATUS AND METHOD FOR IMPROVING HYBRID AUTOMATIC REPEAT REQUEST COMBINING GAIN IN A BROADBAND WIRELESS COMMUNICATION SYSTEM

(75) Inventors: Yoo-Chang Eun, Seoul (KR); Jong-Han Lim, Seoul (KR); In-Hyoung Kim, Yongin-si (KR)

(73) Assignee: Samsung Electronics Co., Ltd (KR)

(*) Notice: Subject to any disclaimer, the term of this patent is extended or adjusted under 35 U.S.C. 154(b) by 524 days.

(21) Appl. No.: 12/503,518

(22) Filed: Jul. 15, 2009

(65) Prior Publication Data

US 2010/0014476 A1  Jan. 21, 2010

(30) Foreign Application Priority Data

Jul. 15, 2008 (KR) .................. 10-2008-0068571

(51) Int. Cl.
*H04W 72/04* (2009.01)
(52) U.S. Cl.
USPC ........... 370/329; 370/335; 370/345; 370/342; 370/340; 714/748; 714/799
(58) Field of Classification Search
USPC .................. 370/329, 335, 342; 375/345, 340; 714/748, 799
See application file for complete search history.

(56) References Cited

U.S. PATENT DOCUMENTS

| 6,236,862 | B1* | 5/2001 | Erten et al. ..................... 455/501 |
| 2006/0009224 | A1* | 1/2006 | Lim et al. ........................ 455/442 |
| 2007/0097942 | A1* | 5/2007 | Gorokhov et al. ............. 370/342 |
| 2007/0189367 | A1 | 8/2007 | Yeo et al. |
| 2008/0112359 | A1* | 5/2008 | Cleveland et al. ............ 370/329 |
| 2008/0165743 | A1* | 7/2008 | Palanki et al. ................ 370/335 |
| 2008/0233966 | A1* | 9/2008 | Scheim et al. ............. 455/452.1 |
| 2009/0158109 | A1* | 6/2009 | Park et al. ...................... 714/748 |

FOREIGN PATENT DOCUMENTS

| CN | 101043657 | 9/2007 |
| JP | 11-215092 | 8/1999 |
| JP | 11-252056 | 9/1999 |
| JP | 2004-112471 | 4/2004 |
| JP | 2007-194747 | 8/2007 |
| JP | 2011-501612 | 1/2011 |
| KR | 1020080054683 | 6/2008 |
| KR | 1020080065528 | 7/2008 |
| WO | WO 2006/069301 | 6/2006 |
| WO | WO 2008-022241 | 2/2008 |

OTHER PUBLICATIONS

Samsung, "On Gold Sequence Initialization", R1-081229, 3GPP TSG RAN WG1 Meeting #52bis, Mar. 2008.

* cited by examiner

*Primary Examiner* — Rasheed Gidado
(74) *Attorney, Agent, or Firm* — The Farrell Law Firm, P.C.

(57) ABSTRACT

An apparatus and method for improving a HARQ combining gain in a broadband wireless communication system are provided. The apparatus includes a seed information generator and a subcarrier allocator. The seed information generator randomly generates a seed value for changing a channel of a subcarrier and an interference pattern in a frame unit when a HARQ combining gain is not generated because an interference pattern is the same during a retransmission period. The subcarrier allocator allocates a subcarrier using the generated seed value.

14 Claims, 5 Drawing Sheets

APPARATUS AND METHOD FOR IMPROVING HYBRID AUTOMATIC REPEAT REQUEST COMBINING GAIN IN A BROADBAND WIRELESS COMMUNICATION SYSTEM

PRIORITY

This application claims priority under 35 U.S.C. §119(a) to a Korean patent application filed in the Korean Intellectual Property Office on Jul. 15, 2008 and assigned Serial No. 10-2008-0068571, the contents of which are incorporated herein by reference.

BACKGROUND OF THE INVENTION

1. Field of the Invention

The present invention relates generally to an apparatus and method for improving a gain based on Hybrid Automatic Repeat reQuest (HARQ) combining in a broadband wireless communication system. More particularly, the present invention relates to an apparatus and method of a system including a plurality of cells, where a Base Station (BS) is located in the center of each cell, for changing an interference pattern at every frame in order to prevent a HARQ combining gain from not being generated when a change of a channel is slow because interference of an adjacent BS is predominant and an interference pattern is the same during a retransmission period in a HARQ scheme for improving a frame error between a Mobile Station (MS) and the BS.

2. Description of the Related Art

A broadband wireless communication system has been introduced to provide efficient wireless Internet services.

The broadband wireless communication system uses an Orthogonal Frequency Division Multiplexing/Orthogonal Frequency Division Multiple Access (OFDM/OFDMA) scheme, that is, transmits a physical channel signal using a plurality of subcarriers, thereby making high-speed data transmission is possible. A wireless access scheme for a broadband wireless communication system is currently being standardized in the Institute of Electrical and Electronics Engineers (IEEE) 802.16 standardization group.

In general, in wireless data communication, an error can occur in data depending on a wireless channel state. A control and recovery technology for this error can be divided into an Automatic Repeat reQuest (ARQ) technique and a Forward Error Correction (FER) coding technique.

A Hybrid ARQ (HARQ) technique is a scheme that combines the ARQ technique with the FER coding technique. The ARQ technique is a scheme that checks an error for a packet received at a receiver through Cyclic Redundancy Check (CRC), feeding a repeat request back to a transmitter if an error occurs, and then retransmitting a corresponding packet from the transmitter.

Accordingly, the transmitter executes retransmission of a HARQ packet or transmission of a new packet depending on an ACKnowledgment (ACK)/Negative ACKnowledgment (NACK) signal. Consequently, a feature of HARQ is to soft-combine a retransmitted packet with a previously received packet, thus reducing the probability of error occurrence.

If an adjacent BS causes interference, particularly, if an adjacent BS mostly transmits only a pilot subcarrier almost without transmitting a data subcarrier because transmit data of a user accessing the adjacent BS is small or there is no user, i.e., if data allocation after a first permutation is maintained because a zone switch is not generated, only a fixed pilot pattern causes interference.

For example, in a HARQ combining process, when interference of an adjacent BS is caused by a pilot subcarrier, first transmission and retransmission signals have no change from a comparison by an equation. However, there is a problem that, when considering a channel estimation error due to interference and assuming that this interference is predominant compared to a thermal noise, a combination of soft decision values of the first transmission and retransmission signals is twice as much as each soft decision value, but there is no gain for a Signal-to-Noise Ratio (SNR).

SUMMARY OF THE INVENTION

The present invention is designed to address at least the above-mentioned problems and/or disadvantages and to provide at least the advantages described below. Accordingly, an aspect of the present invention is to provide an apparatus and method for improving a Hybrid Automatic Repeat reQuest (HARQ) combining gain in a broadband wireless communication system.

Another aspect of the present invention is to provide an apparatus and method for changing an interference pattern at each frame, for improving a HARQ combining gain in a broadband wireless communication system.

Another aspect of the present invention is to provide an apparatus and method for changing seed values of a permutator at each frame and a Pseudo Noise (PN) code generator to improve a HARQ combining gain in a broadband wireless communication system.

The above and other aspects are achieved by providing an apparatus and method improving a HARQ combining gain in a broadband wireless communication system.

In accordance with an aspect of the present invention, a transmitting apparatus for improving a Hybrid Automatic Repeat reQuest (HARQ) combining gain in a broadband wireless communication system is provided. The apparatus includes a seed information generator and a subcarrier allocator. The seed information generator randomly generates a seed value for changing a channel of a subcarrier and an interference pattern in a frame unit, if a HARQ combining gain is not generated because an interference pattern is the same during a retransmission period. The subcarrier allocator allocates data subcarriers using the generated seed value.

In accordance with another aspect of the present invention, a transmitting method for improving a HARQ combining gain in a broadband wireless communication system is provided. The method includes randomly generating a seed value for changing a channel of a subcarrier and an interference pattern in a frame unit, if a HARQ combining gain is not generated because an interference pattern is the same during a retransmission period, and allocating data subcarriers using the generated seed value.

BRIEF DESCRIPTION OF THE DRAWINGS

The above and other aspects, features, and advantages of certain embodiments the present invention will become more apparent from the following detailed description taken in conjunction with the accompanying drawings in which.

Throughout the drawings, like reference numerals will be understood to refer to like parts, components and structures.

DETAILED DESCRIPTION OF EMBODIMENTS OF THE INVENTION

The following description, with reference to the accompanying drawings, is provided to assist in a comprehensive understanding of certain embodiments of the present invention as should be defined by the claims and their equivalents. The description includes various specific details to assist in the comprehensive understanding, but these details are to be regarded as merely exemplary. Accordingly, those of ordinary skill in the art will recognize that various changes and modifications of the embodiments described herein can be made without departing from the scope and spirit of the present invention. Also, descriptions of well-known functions and constructions are omitted for clarity and conciseness.

The following description is made for an apparatus and method of a system including a plurality of cells, where a Base Station (BS) is located in the center of each cell, for changing an interference pattern at every frame in order to prevent a Hybrid Automatic Repeat reQuest (HARQ) combining gain from not being generated when a change of a channel is slow because interference of an adjacent BS is predominant and when an interference pattern is the same during a retransmission period.

Figure 1:
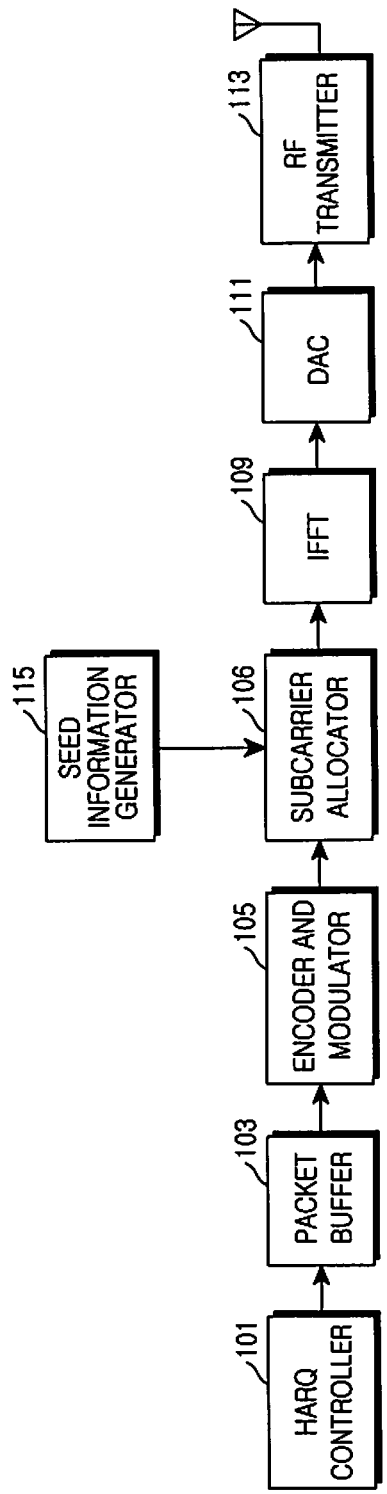
FIG. 1 is a block diagram illustrating a transmitting apparatus for enhancing a Hybrid Automatic Repeat reQuest (HARQ) combining gain according to an embodiment of the present invention.

FIG. 1 is a block diagram illustrating a transmitting apparatus for enhancing a HARQ combining gain according to an embodiment of the present invention. The transmitting apparatus changes a channel of a subcarrier and an interference pattern in order to solve a problem that occurs in the prior art, i.e., that a HARQ combining gain is almost not generated if a change of a channel is very slow because interference of an adjacent BS is predominant and if an interference pattern is the same during a retransmission period, i.e., if data allocation after a first permutation is maintained because a zone switch is not generated.

Referring to FIG. 1, the transmitting apparatus includes a HARQ controller 101, a packet buffer 103, an encoder and modulator 105, a subcarrier allocator 106, an Inverse Fast Fourier Transform (IFFT) operator 109, a Digital-to-Analog Converter (DAC) 111, a Radio Frequency (RF) transmitter 113, and a seed information generator 115.

The HARQ controller 101 determines an Acknowledgment (ACK) or Negative Acknowledgment (NACK) message fed back from a Mobile Station (MS) for a transmitted packet, and determines retransmission or non-retransmission of a corresponding packet. If the NACK message is fed back and retransmission is performed, in a Chase Combining (CC) scheme, the HARQ controller 101 controls to retransmit the same packet, and in an Incremental Redundancy (IR) scheme, the HARQ controller 101 controls to retransmit an extra bit of a next version.

The packet buffer 103 stores a packet to be transmitted, and stores an initially transmitted packet until the ACK message is determined in the HARQ controller 101.

The encoder and modulator 105 encodes and modulates a bit stream from the packet buffer 103 according to a Modulation and Coding Scheme (MCS) level for a transmit packet determined considering a channel state.

The subcarrier allocator 106 maps data signals provided from the encoder and modulator 105 to a subcarrier. Permutator allocates the data from the encoder and modulator 105 and inserts pilots to the predetermined positions. Particularly, an embodiment of the present invention scrambles mixing data and pilot subcarriers of an OFDM symbol using a seed value generated by the seed information generator 115 and multiplying a Pseudo Noise (PN) code native to a BS. That is, the subcarrier allocator 106 changes an interference pattern of an adjacent BS and a channel of a subcarrier by changing a scrambled pilot pattern between frames and changing a data permutation rule.

The seed information generator 115 randomly changes a seed value, i.e., a first seed value, of a permutator and a seed value, i.e., a second seed value, of a PN code generator in order to change channels of subcarriers combined according to HARQ and to change an interference pattern in a frame unit.

The seed information generator 115 may generate the seed value of the permutator and the seed value of the PN code generator using a frame number and a range of a seed value allocated to a BS.

For example, the seed information generator 115 may obtain the seed value of the permutator and the seed value of the PN code generator using Equation (1).

$$\text{Seed}_{(new)} = (fn + s_n) \bmod M_n \quad (1)$$

In Equation (1), $\text{Seed}_{(new)}$ denotes a seed value of a permutator intended for random change, fn denotes a frame number, $s_n$ denotes a range of a seed value allocated to a BS, and $M_n$ denotes a value of adding 1 to the maximum value of the range of the seed value allocated to the BS.

Accordingly, the seed value of the permutator intended for random change and the seed value of the PN code generator are changed within the range of the seed value allocated to the BS.

For example, when assuming that the seed value of the permutator set to the BS is within a range of 0 to 31 and the seed value of the PN code generator set is within a range of 0 to 3, the transmitting apparatus randomly generates the first seed value (i.e., the seed value of the permutator) between the 0 to 31, and randomly generates the second seed value (i.e., the seed value of the PN code generator) between the 0 to 3.

The IFFT 109 acts as an OFDM modulator for converting a frequency domain signal provided from the subcarrier allocator 106 into a time domain OFDM symbol through IFFT operation.

The DAC 111 converts a digital signal provided from the IFFT 109 into an analog signal. The RF transmitter 113 converts a baseband signal provided from the DAC 111 into an RF band signal, and amplifies and transmits the RF band signal through an antenna.

The function of the seed information generator 115 may be implemented by the subcarrier allocator 106 of the transmitting apparatus. However, for ease of explanation, these elements are separately illustrated in FIG. 1 and are not intend to limit the scope of the present invention. It will be understood by those skilled in the art that various modifications of construction may be made within the scope of the present invention. For example, a subcarrier allocator 106 could process all of the functions.

Figure 2:
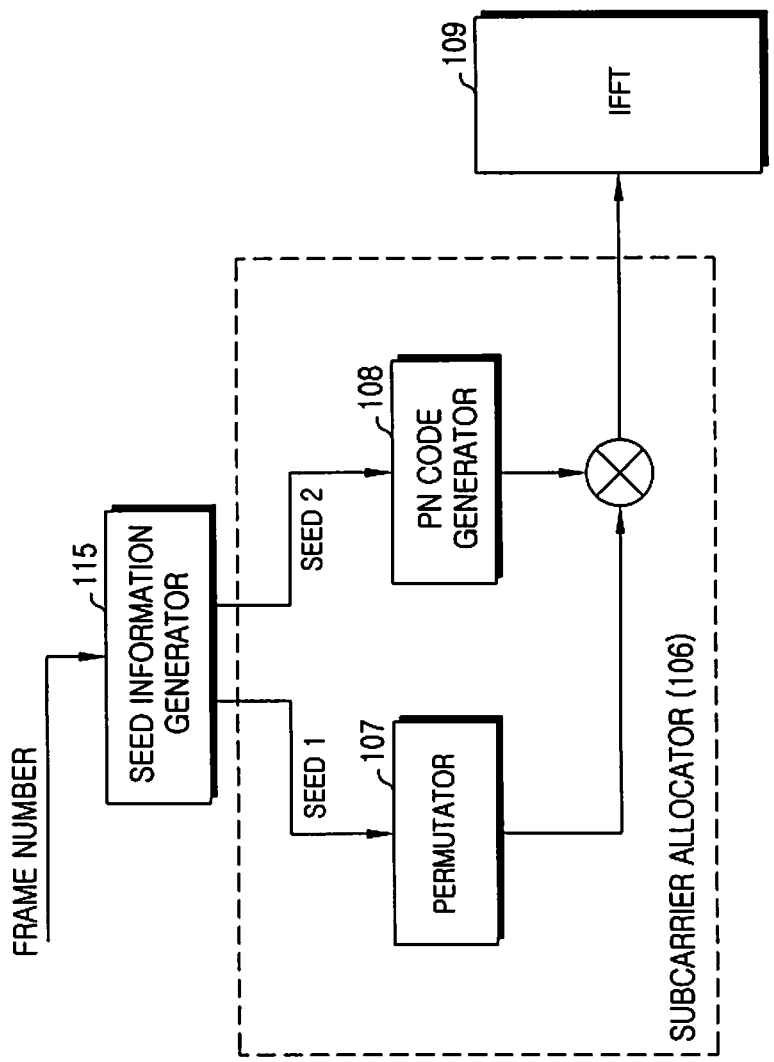
FIG. 2 is a block diagram illustrating a subcarrier allocator for enhancing a HARQ combining gain according to an embodiment of the present invention.

FIG. 2 is a block diagram illustrating a subcarrier allocator for enhancing a HARQ combining gain according to an embodiment of the present invention.

Referring to FIG. 2, the subcarrier allocator 106 includes a permutator 107 and a PN code generator 108. The subcarrier allocator 106 changes an interference pattern at every frame in order to prevent a HARQ combining gain from not being generated, if a change of a channel is slow because interference of an adjacent BS is predominant and if an interference pattern is the same during a retransmission period, i.e., if data allocation after a first permutation is maintained because a zone switch is not generated in a broadband wireless communication system.

In order to perform the above operation, the subcarrier allocator 106 uses a seed value of the permutator 107 and a seed value of the PN code generator 108 that are randomly generated using a frame number by the seed information generator 115. That is, in order to prevent a HARQ combination gain from not being generated because an interference pattern is the same during a retransmission period, the subcarrier allocator 106 changes an interference pattern at every frame by permuting to mix data subcarriers of a symbol intended for transmission by the first seed value of the permutator 107 and multiplying PN code that is native to a BS by the second seed value of PN code generator 108. Thereafter an IFFT process is performed.

Figure 3:
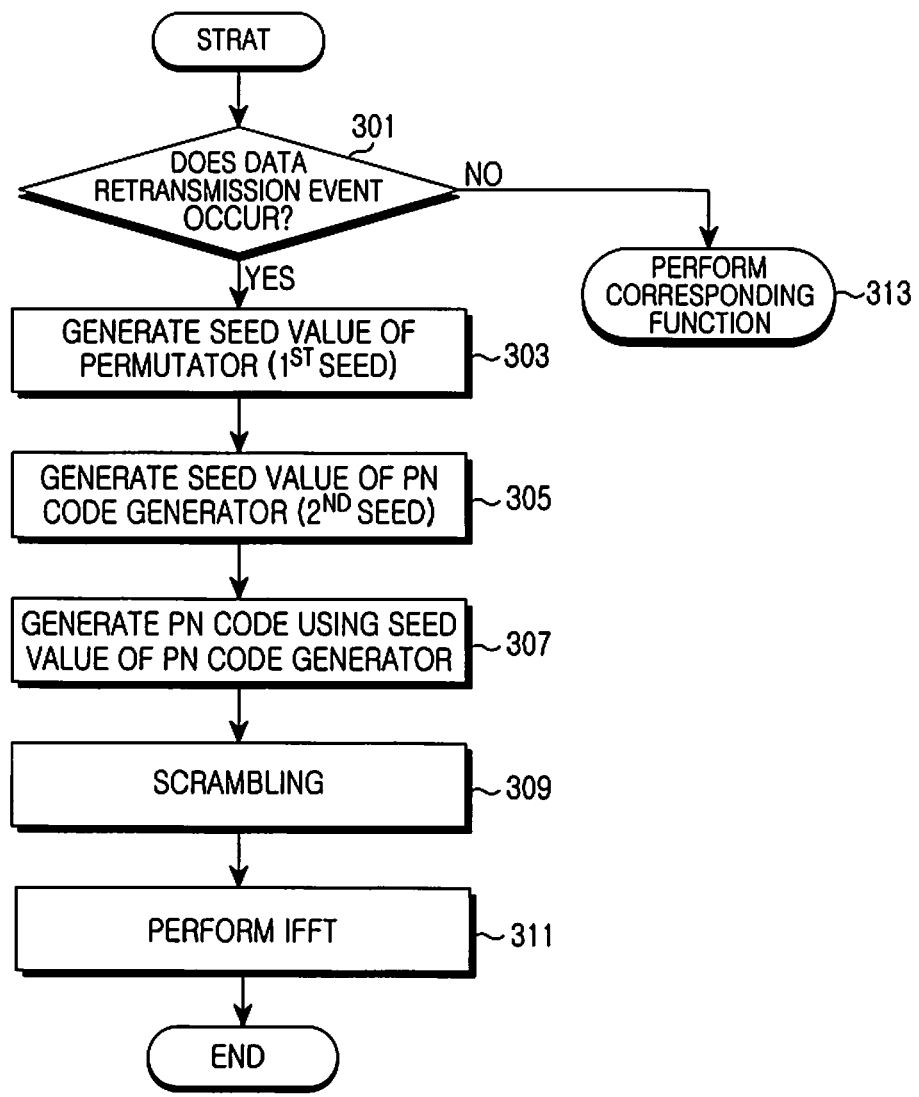
FIG. 3 is a flowchart illustrating a process of subcarrier allocation for enhancing a HARQ combining gain in a transmitting apparatus according to an embodiment of the present invention.

FIG. 3 is a flowchart illustrating a process of subcarrier allocation for enhancing a HARQ combining gain in a transmitting apparatus according to an embodiment of the present invention.

Referring to FIG. 3, in step 301, the transmitting apparatus determines if a data retransmission event occurs. When the data retransmission event does not occur, the transmitting apparatus g performs a corresponding function (e.g., continuous data transmission, etc.) in step 313.

When the data retransmission event occurs, the transmitting apparatus generates a first seed value, i.e., a seed value of a permutator, in step 303. In step 305, the transmitting apparatus generates a second seed value, i.e., a seed value of a PN code generator.

The transmitting apparatus changes a data allocation position by randomly changing the first seed value and the second seed value in order to change channels of subcarriers combined according to HARQ and to change an interference pattern.

Also, by changing the first seed value and the second seed value at every frame, the transmitting apparatus prevents the generation of circumstances in which a pilot pattern between adjacent BSs or a data permutation rule are consistent, even at an arbitrary time such as an initial setting. Accordingly, the transmitting apparatus changes an interference pattern of an adjacent BS and a channel of a subcarrier by changing a pilot pattern between frames and by changing a data permutation rule.

In step 307, the transmitting apparatus generates a PN code using the second seed value generated in step 305. In step 309, the transmitting apparatus performs a scrambling process (i.e. data subcarrier allocation and PN code masking) using the generated seed values of the permutator and PN code generator. That is, the transmitting apparatus scrambles mixing data and pilot subcarriers of an OFDM symbol intended for transmission and multiplies a PN code native to a BS.

In step 311, the transmitting apparatus converts a frequency domain signal provided from a subcarrier allocator of the transmitting apparatus into a time domain OFDM symbol through IFFT, and then converts a digital signal into an analog signal. Thereafter, the transmitting apparatus converts a baseband signal, which is converted into the analog signal, into an RF band signal, and amplifies and transmits the RF band signal through an antenna.

Figure 4:
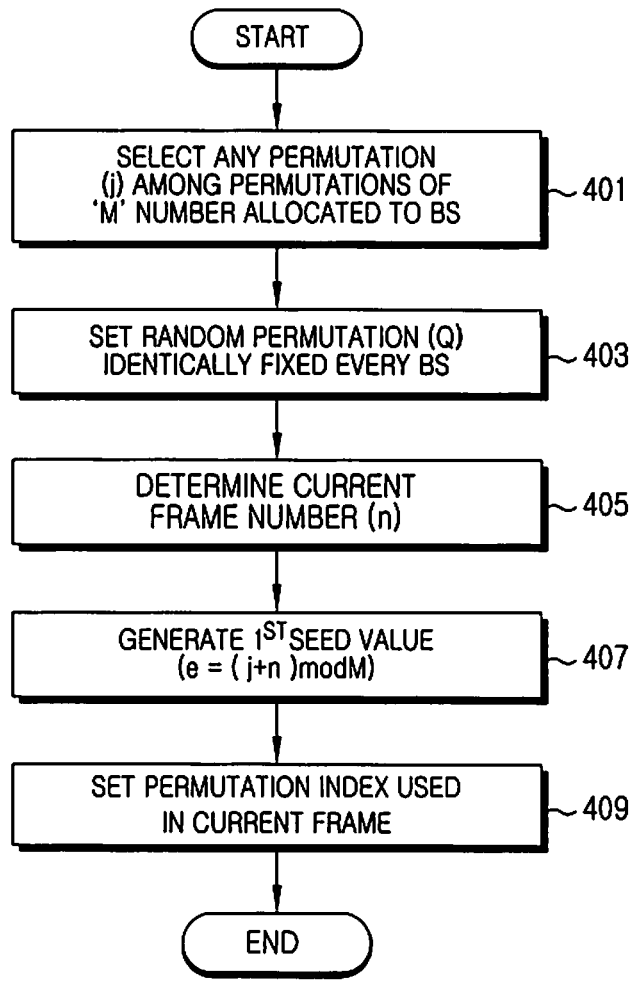
FIG. 4 is a flowchart illustrating a process of generating a seed value of a permutator in a transmitting apparatus according to an embodiment of the present invention.

FIG. 4 is a flowchart illustrating a process of generating a seed value of a permutator in a transmitting apparatus according to an embodiment of the present invention.

Referring to FIG. 4, in step 401, the transmitting apparatus selects any permutation (j) among permutations of M number allocated to a BS, which is identified generally in the cell planning stage not to overlap with an adjacent BS (or sector). In step 403, the transmitting apparatus sets a random permutation (Q) identically fixed in every BS. This allocates a BS (or a sector) its own permutation (j) among the permutations of the M number different from each other. That is, the transmitting apparatus performs allocation such that an adjacent BS (or sector) does not use the same permutation if possible even after applying the identical permutation changing rule (Q) of step 403 in the 409 step, thus still preventing an interference pattern from not overlapping with each other.

In step 405, the transmitting apparatus determines a current frame number (n). In step 407, the transmitting apparatus generates a first seed value for a current frame. That is, as described above, the transmitting apparatus generates a first seed value is to changes an index for the permutation to an adjacent BS does not use the same permutation at each frame. That the transmitting apparatus determines the frame number is to change a channel of a combined subcarrier to obtain a HARQ combining gain and an interference pattern in a frame unit. That is, the transmitting apparatus differently sets a seed value of a permutator every frame using a frame number that increases every frame.

Also, the transmitting apparatus may set a first seed value that uses a frame number and a range of a seed value, using Equation (2).

$$e=(j+n) \bmod M \qquad (2)$$

In Equation (2), e denotes a seed value of a permutator intended for random change, n denotes a frame number, j denotes any permutation among a range of a seed value allocated to a BS, and M denotes the range of the seed value allocated to the BS.

More specifically, Equation (2) is used to change a seed value of a permutator intended for random change, within the range of the seed value allocated to the BS.

For example, if setting a seed value of a permutator of a range of 0 to 31 in the BS, the transmitting apparatus is to randomly generate the seed value of the permutator between 0 and 31.

In step 409, the transmitting apparatus sets a permutation index (k=Q(e)) used in a current frame. Here, an index (e), which is the first seed value, is selected as a permutation index (k) to be used in an $n^{th}$ frame of the BS by a permutation (Q). In a permutation set $\{P_0, P_1, \ldots, P_{M-1}\}$, a permutation ($P_k$) is selected.

Figure 5:
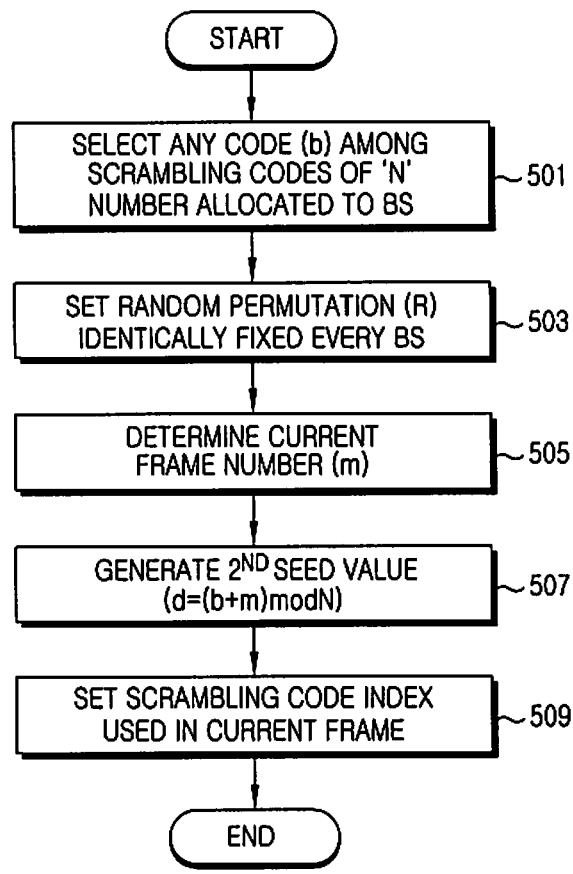
FIG. 5 is a flowchart illustrating a process of generating a seed value of a PN code generator in a transmitting apparatus according to an embodiment of the present invention.

FIG. 5 is a flowchart illustrating a process of generating a seed value of a PN code generator in a transmitting apparatus according to an embodiment of the present invention.

Referring to FIG. 5, in step 501, the transmitting apparatus allocates any scrambling code (b) among permutations of N number allocated to a BS. In step 503, the transmitting apparatus sets a random permutation (R) identically fixed every BS in order to allocate a BS (or a sector) its own one scrambling code among the permutations of the N number different from each other. The transmitting apparatus performs allocation such that an adjacent BS (or sector) does not use the same permutation if possible, thus preventing an interference pattern from not overlapping with each other.

In step 505, the transmitting apparatus determines a current frame number (m). In step 507, the transmitting apparatus generates a second seed value for a current frame. That is, as described above, the transmitting apparatus selects any one of the allocated arbitrary permutations of a BS and changes an index for the permutation.

Also, the transmitting apparatus may set a second seed value that uses a frame number and a range of a seed value, using Equation (3).

$$d = (b+m) \bmod N \qquad (3)$$

In Equation (3), d denotes a seed value of a PN code generator intended for random change, m denotes a frame number, b denotes any permutation among a range of a seed value allocated to a BS, and N denotes the range of the seed value allocated to the BS.

In step 509, the transmitting apparatus sets a permutation index (k=R(d)) used in a current frame. Here, an index (d), which is the second seed value, is selected as a permutation index (k) to be used in an $m^{th}$ frame of the BS by a permutation (R). In a scrambling code set $\{C_0, C_1, \ldots, C_{N-1}\}$, a permutation ($C_k$) is selected.

In FIGS. 4 and 5, when generating seed values of a permutator and a PN code generator in accordance with the above-described embodiments of the present invention, the transmitting apparatus may use a different seed value at every frame with a frame number that increases by one every frame. Also, the seed values of the permutator and PN code generator are determined by a value of DL_PermBase and PRBS_ID thus, the transmitting apparatus applies the above described method, thereby being able to obtain the same effect although generating a new DL_PermBase and a new PRBS_ID. The DL_PermBase and the PRBS_ID are the values that are used in determining a seed value of a permutator and a seed value of a Pseudo Noise (PN) code generator. That is, the transmitting apparatus may generate the seed values of the permutator and PN code generator using Equation (4) and (5).

$$DL\_PermBase\_new = (fn + DL\_PermBase) \bmod M_n \qquad (4)$$

$$PRBS\_ID\_new = (fn + PRBS\_ID) \bmod N_n \qquad (5)$$

In Equation (4), DL_PermBase_new is a new DL_PermBase value generated according to an embodiment of the present invention, fn is a frame number, $s_n$ denotes a range of a seed value allocated to a BS, and the $M_n$ denotes a value of adding 1 to a maximum value of a range of the seed value allocated to the BS. In Equation (5), PRBS_ID_new is a new PRBS_ID value generated according to an embodiment of the present invention, fn is a frame number, and the $N_n$ denotes a value of adding 1 to maximum value of range of the seed value allocated to the BS.

In the above method, the transmitting apparatus changes an interference pattern of an adjacent channel by randomly regenerating a seed value of a PN code generator in a frame unit and changing a PN code between frames, and changes a position of a data subcarrier at every frame by randomly regenerating a seed value of a permutator in a frame unit and changing a permutation rule of a data subcarrier. Consequently, the transmitting apparatus changes a position of a data subcarrier at every frame, thereby inducing a channel change between frames for a HARQ combining subcarrier even in a slow fading channel and being able to improve a combining gain.

TABLE 1

| FER (%) | $1^{st}$ transmission | $2^{nd}$ transmission | $3^{rd}$ transmission | $4^{th}$ transmission |
|---|---|---|---|---|
| Conventional method | 10.0 | 6.3 | 4.2 | 2.5 |
| Proposed method | 10.0 | 0.3 | 0.1 | 0.0 |

Table 1 is a result of experimenting on combining gain improvement in a WiMAX® system. More specifically, in a serving BS, a Multiple Input Multiple Output (MIMO) region started from a $5^{th}$ symbol and a burst was encoded at a Concatenated Turbo Code (CTC) ⅔ coding rate and modulated with 64 Quadrature Amplitude Modulation (64 QAM). Also, a MIMO transmission format of a burst was a Space Time Code (STC) form. An adjacent BS was assumed for an interference channel. This BS was assumed to transmit only a pilot excepting a DownLink/UpLink (DL/UL)-MAP region.

In the above condition, when a Signal-to-Noise Ratio (SNR) was high enough, a Signal-to-Interference Ratio (SIR)=17 dB, and a channel was of a pedestrian B type and assumed a speed of 1 km/h. From this experiment result, when an initial FER is equal to 10%, in the case of allowance up to a $2^{nd}$ retransmission, an error of 6.3% occurs in a conventional method, but only an error of 0.3% occurs in a method of the present invention. In the case of allowance up to a $4^{th}$ retransmission, an error of 2.5% remained in the conventional method, but no error remained in the method of the present invention. Accordingly, it may be confirmed that the method of the present invention improves a HARQ combining gain.

As described above, in accordance with the embodiment of the present invention, an interference pattern is changed at each frame by changing seed values of a permutator and a PN code generator at each frame to improve a HARQ combining gain in a broadband wireless communication system. Consequently, this solves a problem that a HARQ combining gain is not generated when a change of a channel is slow because interference of an adjacent BS is predominant and when an interference pattern is the almost same or varying slowly during a retransmission period. Accordingly, a receiving apparatus may receive signals, which interference pattern has been changed, from a transmitting apparatus; and recover the signals to the original signal.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A transmitting apparatus for improving a Hybrid Automatic Repeat reQuest (HARQ) combining gain in a broadband wireless communication system, the apparatus comprising:
    a seed information generator configured to randomly generate a seed value for changing a channel of a subcarrier and an interference pattern in a frame unit, when the HARQ combining gain is not generated because an interference pattern remains unchanged during a retransmission period; and
    a subcarrier allocator configured to allocate a subcarrier using the generated seed value,
    wherein the seed information generator generates the seed value using a frame number and a range of a seed value allocated to a Base Station (BS), and wherein the seed information generator generates at least one of a seed value of a permutator and a seed value of a Pseudo Noise (PN) code generator, as the generated seed value.

2. The apparatus of claim 1, wherein the seed information generator generates the seed value of the permutator using:

$$e=(j+n) \bmod M,$$

where e indicates a seed value of a permutator intended for random change, n indicates the frame number, j indicates a permutation among the range of the seed value allocated to the BS, and M indicates the range of the seed value allocated to the BS.

3. The apparatus of claim 1, wherein the seed information generator generates the seed value of the PN code generator using:

$$d=(b+m) \bmod N,$$

where d indicates a seed value of a PN code generator intended for random change, m indicates the frame number, b indicates a permutation among the range of the seed value allocated to the BS, and N indicates the range of the seed value allocated to the BS.

4. The apparatus of claim 1, wherein the seed information generator generates a DL_PermBase value as the generated seed value.

5. The apparatus of claim 4, wherein the seed information generator generates the DL_PermBase value using:

$$DL\_PermBase\_new=(fn+DL\_PermBase) \bmod M_n,$$

where DL_PermBase_new indicates a new DL_PermBase value generated, fn indicates the frame number, $s_n$ indicates the range of the seed value allocated to the BS, and $M_n$ indicates a value of adding 1 to a maximum value of the range of the seed value allocated to the BS.

6. The apparatus of claim 5, wherein the seed information generator generates a Pseudo-Random Bit Sequence IDentifier (PRBS_ID) value using:

$$PRBS\_ID\_new=(fn+PRBS\_ID) \bmod N_n,$$

where PRBS_ID_new indicates a new PRBS_ID value generated,
fn indicates the frame number, and
$N_n$ indicates a value of adding 1 to maximum value of range of the seed value allocated to the BS.

7. A transmitting method for improving a Hybrid Automatic Repeat reQuest (HARQ) combining gain in a broadband wireless communication system, the method comprising:
randomly generating a seed value for changing a channel of a subcarrier and an interference pattern in a frame unit, when the HARQ combining gain is not generated because an interference pattern remains unchanged during a retransmission period; and
allocating a subcarrier using the generated seed value,
wherein the seed value is randomly generated using a frame number and a range of a seed value allocated to a Base Station (BS), and
wherein the generated seed value includes at least one of a seed value of a permutator and a seed value of a Pseudo Noise (PN) code generator.

8. The method of claim 7, wherein the seed value of the permutator is generated using:

$$e=(j+n) \bmod M,$$

where e indicates a seed value of a permutator intended for random change, n indicates the frame number, j indicates a permutation among the range of the seed value allocated to the BS, and M indicates the range of the seed value allocated to the BS.

9. The method of claim 7, wherein the seed value of the PN code generator is generated using:

$$d=(b+m) \bmod N,$$

where d indicates a seed value of a PN code generator intended for random change, m indicates the frame number, b indicates a permutation among the range of the seed value allocated to the BS, and N indicates the range of the seed value allocated to the BS.

10. The method of claim 7, wherein the generated seed value is a DL_PermBase value.

11. The method of claim 10, wherein the DL_PermBase value is generated using:

$$DL\_PermBase\_new=(fn+DL\_PermBase) \bmod M_n,$$

where DL_PermBase_new indicates a new DL_PermBase value generated, fn indicates the frame number, $s_n$ indicates the range of the seed value allocated to the BS, and $M_n$ indicates a value of adding 1 to a maximum value of the range of the seed value allocated to the BS.

12. The method of claim 11, wherein a Pseudo-Random Bit Sequence IDentifier (PRBS_ID) value is generated using:

$$PRBS\_ID\_new=(fn+PRBS\_ID) \bmod N_n,$$

where PRBS_ID_new indicates a new PRBS_ID value generated, fn indicates the frame number, and $N_n$ indicates a value of adding 1 to maximum value of range of the seed value allocated to the BS.

13. A receiving apparatus for improving a Hybrid Automatic Repeat reQuest (HARQ) combining gain in a broadband wireless communication system, the apparatus comprising:
a receiver configured to receive a signal having a changed interference pattern using a seed value from a transmitting apparatus, and recovering an original signal from the received signal,
wherein the seed value is randomly generated using a frame number and a range of a seed value allocated to a Base Station (BS), and
wherein the generated seed value includes at least one of a seed value of a permutator and a seed value of a Pseudo Noise (PN) code generator.

14. A receiving method for improving a Hybrid Automatic Repeat reQuest (HARQ) combining gain in a broadband wireless communication system, the method comprising:
receiving a signal having a changed interference pattern using a seed value from a transmitting apparatus; and
recovering an original signal from the received signal,
wherein the seed value is randomly generated using a frame number and a range of a seed value allocated to a Base Station (BS), and
wherein the generated seed value includes at least one of a seed value of a permutator and a seed value of a Pseudo Noise (PN) code generator.

* * * * *